(12) United States Patent
Dillon

(10) Patent No.: US 6,729,557 B2
(45) Date of Patent: May 4, 2004

(54) PARTICULATE SPREADER

(76) Inventor: Patrick Dillon, 172 River Dr., Lack Hiawatha, NJ (US) 07034

( * ) Notice: Subject to any disclaimer, the term of this patent is extended or adjusted under 35 U.S.C. 154(b) by 107 days.

(21) Appl. No.: 10/158,833

(22) Filed: Jun. 3, 2002

(65) Prior Publication Data

US 2003/0222161 A1 Dec. 4, 2003

(51) Int. Cl.[7] .......................... A01C 17/00; A62C 15/00
(52) U.S. Cl. ................ 239/152; 239/683; 239/142; 239/154; 239/652; 239/653; 239/681; 239/686
(58) Field of Search ................ 239/142, 152, 239/154, 652, 653, 681, 683, 686, 689, 302, 374, 375, 379, 650, 664, 680; 222/175; D8/2

(56) References Cited

U.S. PATENT DOCUMENTS

| | | |
|---|---|---|
| 95,241 A | 9/1869 | Lewis |
| 160,733 A | 3/1875 | Walker |
| 1,551,877 A | 9/1925 | Henning |
| 2,707,068 A | 4/1955 | Williamson |
| 3,220,954 A | 11/1965 | Malbe |
| 3,993,225 A | 11/1976 | Manni |
| 4,678,377 A | 7/1987 | Bouchard |
| 5,119,993 A | 6/1992 | Gunzel, Jr. et al. |
| 5,123,598 A | 6/1992 | Courtney et al. |
| 5,409,166 A | 4/1995 | Gunzel, Jr. et al. |
| 6,024,294 A * | 2/2000 | Dillon ........................ 239/7 |
| 6,089,477 A * | 7/2000 | Dillon ...................... 239/653 |
| 6,092,746 A | 7/2000 | Dillon |
| 6,425,500 B2 * | 7/2002 | McNally ................... 222/175 |

* cited by examiner

Primary Examiner—Robin O. Evans
(74) Attorney, Agent, or Firm—Siemens Patent Services, LC

(57) ABSTRACT

A portable particulate spreader comprising a container having a closed end, an open end and a storage chamber for holding particulate matter therein is disclosed. A first handle is attached to a side of the container proximate the closed end. A second handle is attached, preferably pivotally, to the same side, approximately midway between the closed end and the open end, allowing a person to conveniently grasp the spreader in either a vertical position for carrying or a horizontal position for use. An impeller at the open end disperses the particulate outwardly and downwardly from the spreader.

7 Claims, 2 Drawing Sheets

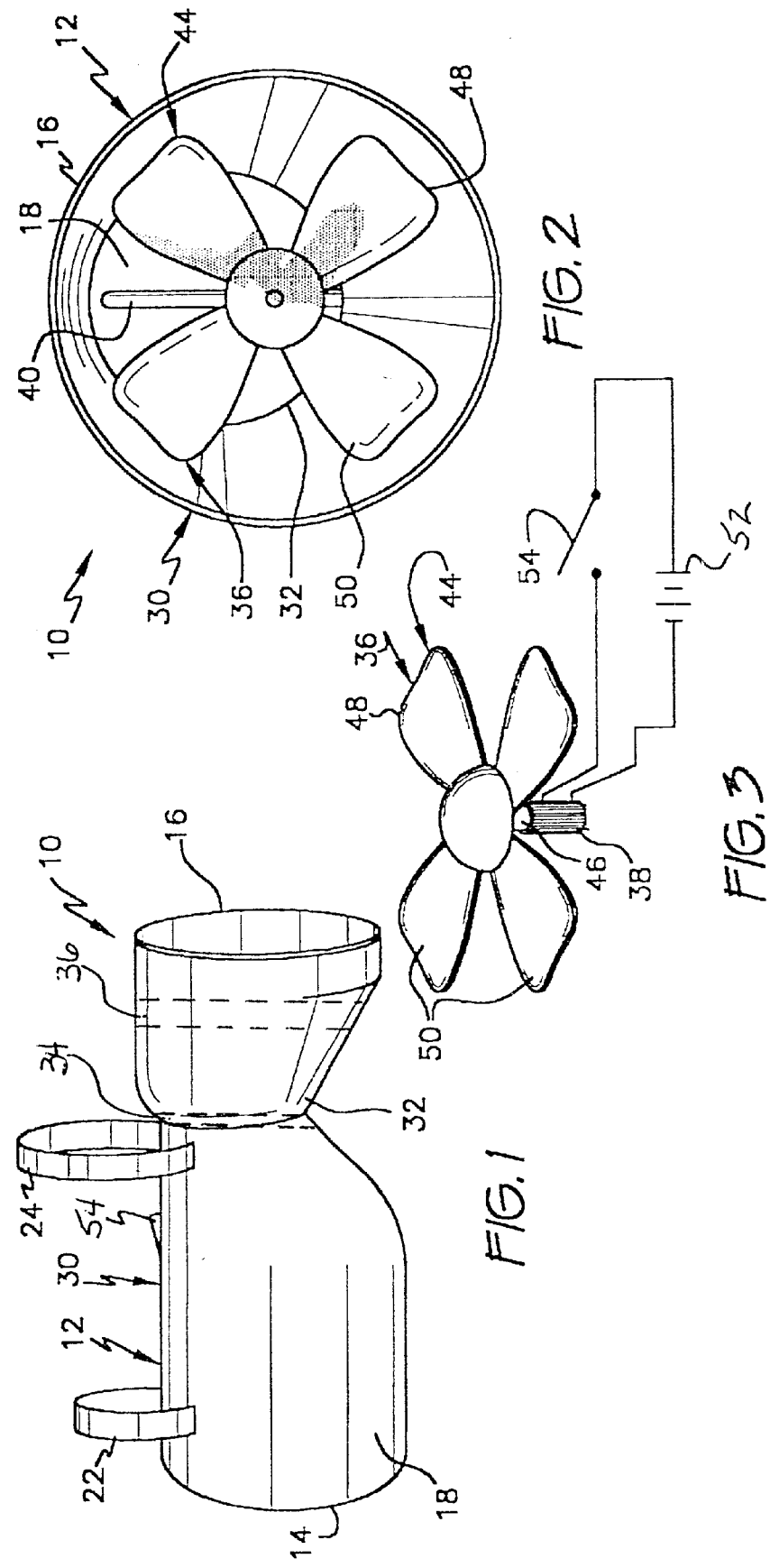

PARTICULATE SPREADER

This application is related to my previous application, Ser. No. 09/273,456, filed on Mar. 22, 1999, now issued as U.S. Pat. No. 6,092,746, on Jul. 25, 2000, included herein, by reference.

BACKGROUND OF THE INVENTION

1. Field of the Invention

The present invention relates to devices which distribute small particulate materials, such as chemicals, fertilizers, seed, herbicides, and the like. More particularly, the invention comprises a spreader which, by virtue of its novel design, is lighter than those developed previously.

2. Description of the Prior Art

Over the years, numerous variations of the basic hand held particulate dispenser have been set forth with varying degrees of success.

U.S. Pat. No. 95,241, issued to John S. Lewis on Sep. 28, 1869, presents a SEED PLANTER, a simple hand held seed spreader having a plurality of separate compartments along its length, each compartment having a aperture for releasing seeds. Seed distribution is caused by agitation of the spreader by shaking. By contrast, the present invention distributes particulate from a single hopper by a rotary dispersing mechanism.

U.S. Pat. No. 160,733, issued to Alexander Walker on Mar. 9, 1875, discloses a SEED SOWER, a cylindrical tube having a wire mesh cap through which seed is dispersed by shaking. Again, by contrast, the present invention distributes particulate from a hopper by a rotary dispersing mechanism.

U.S. Pat. No. 1,551,877, issued to Leslie G. Henning on Sep. 1, 1925, presents a DRY POWDER DUSTER AND METHOD OF FORMING DUST CLOUDS. Powdered insecticide, or similar material, contained in a hopper is fed by a hand crank powered worm drive into a duct below. A series of fan blades, driven by the same hand crank, incrementally introduce air into the powder so as to diffuse the powder and disperse it on the flow of air. The present invention, conversely, feeds particulate from the hopper by gravity and distributes the particulate by a rotary dispersing mechanism.

U.S. Pat. No. 2,707,068, issued to Willis N. Williamson on Apr. 26, 1955, presents a POISON DISPENSER of a design quite similar to a caulking gun. A poison is mixed in the chamber of the dispenser and discharged through a nozzle by the squeezing of a trigger mechanism which aligns a port in the face of the dispenser and the nozzle opening. Feed of the poison through the nozzle is by gravity. WILLIAMSON provides no means of dispersing the poison at a distance away from the nozzle, as does the present invention.

U.S. Pat. No. 3,220,954, issued to Benjamin Malbe on Nov. 30, 1965, discloses a LATHER GENERATOR AND DISPENSER, in which a battery operated motor is mounted on a shaving mug having a spout for generating and dispensing shaving lather. A first blade proximate the bottom of the mug agitates a soap solution to generate a lather while a second, higher blade propels the lather upward toward the spout. In contradistinction, the present invention provides no agitation of the particulate within the hopper nor any vertical propulsion of the particulate.

U.S. Pat. No. 3,993,225, issued to Mario Manni on Nov. 23, 1976, teaches a PORTABLE SPREADER FOR PARTICULATE MATERIAL. A rotary platform having vanes radiating from its center serves as a lateral impeller to disperse particulate dropped onto the platform from a hopper above the platform and through an aperture at the front of the spreader. In contrast, the present invention has no rotary platform, but rather, a fan type blade which disperses particulate both laterally and downwardly.

U.S. Pat. No. 4,678,377, issued to Antoine J. Bouchard on Jul. 7, 1987, presents a DISPENSER FOR PARTICULATE MATTER, in which a powdered substance is introduced into an air stream from a manipulable pouch, quite similar to discharging the contents of a vacuum cleaner bag through the discharge chute of a vacuum cleaner. By contrast, the present invention relies on gravity and physical propulsion to disperse heavier particulate rather than air flow to disperse a powder.

U.S. Pat. Nos. 5,119,993, and 5,409,166, issued to Rudolph M. Gunzel, Jr., et al., on Jun. 9, 1992, and Apr. 25, 1995, respectively, set forth a PORTABLE PARTICULATE MATERIAL SPREADER and BATTERY-POWERED PARTICULATE SPREADER, respectively. In each case, particulate matter is dispersed from a container into a blower mechanism from which the particulate is dispersed by air pressure. Again, the present invention relies on gravity and physical propulsion to disperse heavier particulate, rather than air flow to disperse a powder.

U.S. Pat. No. 5,123,598, issued to Steve P. Courtney, et al., on Jun. 23, 1992, sets forth PORTABLE SPREADING DEVICES in which a particulate is dispensed from a hopper onto a rotating impeller plate below for dispersing in a rotary manner. An impeller within the hopper agitates the particulate within the hopper to facilitate the particulate dropping onto the impeller. In contrast, the present invention does not rely on an agitator to feed particulate to the impeller, nor a plate type impeller, but rather a fan blade type impeller.

None of the above inventions and patents, taken either singly or in combination, is seen to describe the instant invention as claimed.

SUMMARY OF THE INVENTION

The present invention is a portable particulate spreader consisting of a container having a venturi shaped throat and a pair of handles so that a person can grasp the handles with both hands for operation of the spreader. An electrically driven impeller disperses the particulate outwardly and downwardly from the spreader.

Accordingly, a principal object of the invention is to provide a portable particulate spreader which will overcome the shortcomings of the prior art devices.

It is another object of the invention to provide a portable particulate spreader that will quickly dispense particulate evenly over large areas, thus enabling a person to spread the particulate efficiently.

It is a further object of the invention to provide a portable particulate spreader which will reduce the cost associated with spreading of particulate matter.

Still another object of the invention is to provide a portable particulate spreader which is simple and easy to use.

An additional object of the invention is to provide a portable particulate spreader which is easy to clean after use.

It is again an object of the invention to provide a portable particulate spreader that is economical to manufacture and therefore economical to purchase.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is a side perspective view of the present invention.

FIG. 2 is an end view of the present invention showing the fan/impeller.

FIG. 3 is a perspective view of the electric motor and fan/impeller with electric schematic.

DETAILED DESCRIPTION OF THE PREFERRED EMBODIMENTS

Figure 4:
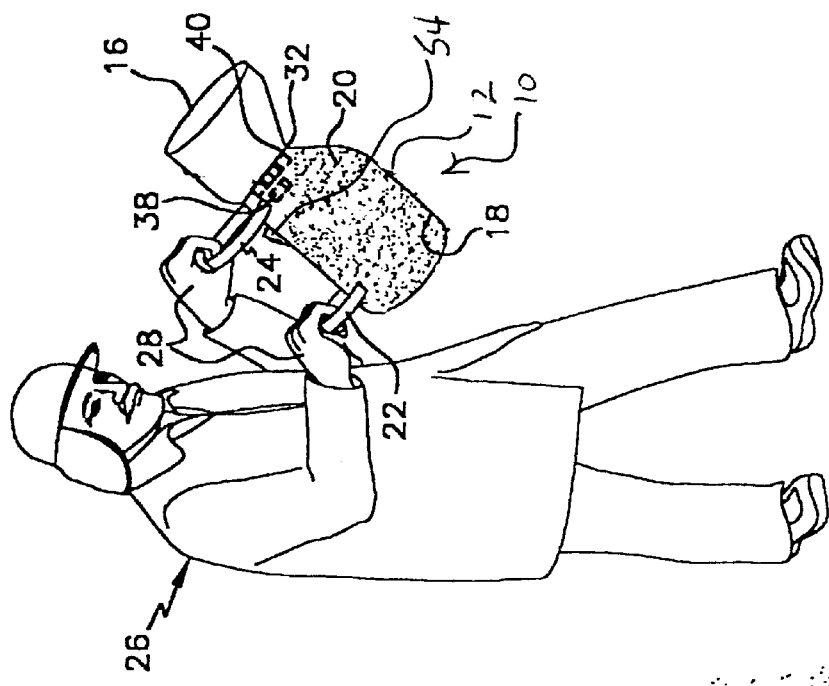
FIG. 4 is a perspective view showing an individual holding the present invention in a generally vertical position, thereby containing particulate therein.

In referring to FIGS. 1–5, like reference numbers refer to like elements throughout the several views.

Referring first to FIG. 1, portable particulate spreader 10 comprises a container 12 having a closed end 14, an open end 16 and a storage chamber 18 for holding particulate matter 20 (FIGS. 4 & 5) therein. A first handle 22 is attached to a side of container 12 proximate closed end 14. A second handle 24 is attached, preferably pivotally, to the same side of container 12 proximate a mid-point between said closed end 14 and said open end 16, such that an individual may grasp handles 22 and 24 to manipulate spreader 10 from a vertical position for filling spreader 10 and carrying it from place to place to a horizontal position for dispensing particulate matter 20 from open end 16.

Container 12 further includes a cylindrical body 30 having a venturi shaped constricted throat 32 allowing particulate matter 20 to flow from within body 30 through a dispensing assembly 36 to open end 16 for dispensing particulate matter 20 out of open end 16 of spreader 10.

Dispensing assembly 36 comprises an electric motor 38 fixedly mounted between the constricted throat 32 and open end 16 of body 30 by bracket 40 so as to allow particulate matter 20 to flow around it. Electric motor 38 is operatively connected to a switch 54 mounted on container 16 proximate one of handles 22 or 24 and a battery 52. An impeller 44 comprising a propeller 48 having radiating blades 50, is mounted on shaft 46 of motor 38 between motor 38 and open end 16 of spreader 10. As particulate matter 20 falls through constricted throat 32 of container 12, it is struck by and ejected from spreader 10 by the blades 50 of impeller 44. An optional, openable diaphragm 34, operated by a control lever 35 may be situated within constricted throat 32 to allow/deny passage of particulate matter 20 through constricted throat 32. Due to the design of cylindrical body 30 and throat 32, particulate matter 20 is able to flow freely from body 30, through throat 32, eliminating the typical need for an agitator within body 30 to force particulate matter 20 through throat 32.

Figure 5:
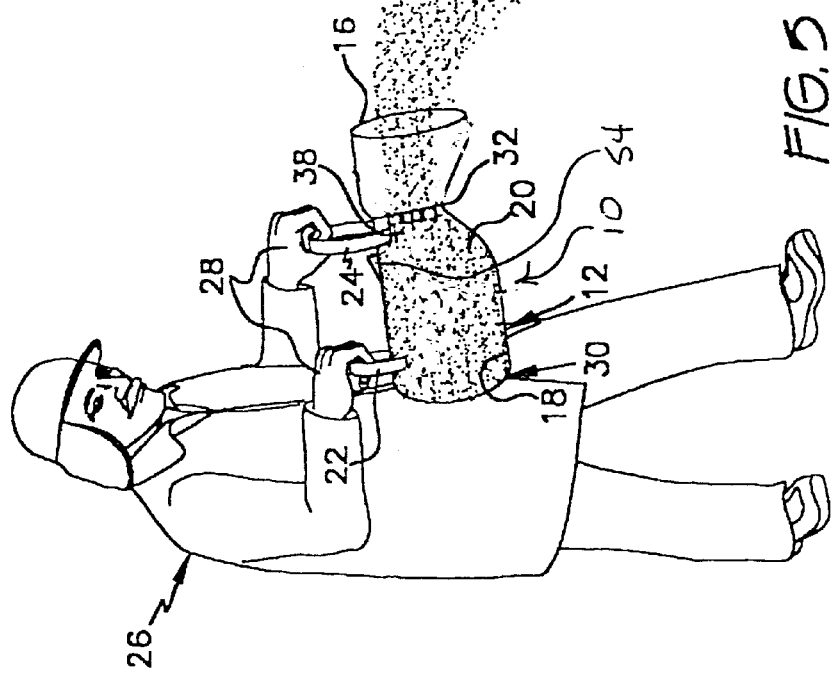
FIG. 5 is a perspective view showing an individual holding the present invention in a generally horizontal position dispensing particulate therefrom.

As illustrated in FIGS. 4 & 5, in use, an individual 26 places particulate matter 20 into storage chamber 18 of container 12, grasps handles 22 and 24 with his hands 28, turns on motor 38 at switch 54, and tilts spreader 10 such that particulate matter 20 flows through constricted throat 32, striking impeller (not shown) and thereby being broadcast from open end 16 of spreader 10.

It is to be understood that the present invention is not limited to the embodiments described above, but encompasses any and all embodiments within the scope of the following claims.

What is claimed is:

1. A portable particulate spreader comprising:

a container having a closed end, an open end and a storage chamber for holding particulate matter therein;

a first handle attached to a side of said container proximate said closed end;

a second handle attached to said side of said container proximate a mid-point between said closed end and said open end;

dispersing means for dispersing said particulate matter from said open end of said container;

an electric motor operatively attached, proximate said open end and within said container, to said dispersing means;

a bracket adapted for mounting said electric motor within said spreader; and an openable diaphragm proximate said open end, said diaphragm adapted to selectively allow and deny passage of said particulate mater through said open end.

2. A portable particulate spreader, as defined in claim 1, wherein said container further includes a cylindrical body having a venturi shaped constricted throat.

3. A portable particulate spreader, as defined in claim 2, wherein said openable diaphragm is positioned within said venturi shaped constricted throat.

4. A portable particulate spreader, as defined in claim 1, wherein said dispersing means comprises:

an impeller mounted on a drive shaft of said electric motor such that, when said motor is turned on, said impelled will rotate and eject said particulate matter out of said open end of said container.

5. A portable particulate spreader, as defined in claim 4, wherein said impeller comprises:

a propeller having radiating blades mounted on said drive shaft of said electric motor, said radiating blades adapted to broadcast said particulate matter from said open end of said container.

6. A portable particulate spreader, as defined in claim 1, further comprising:

a battery operatively connected to said electric motor; and a switch mounted on said container and operatively connected between said electric motor and said battery.

7. A portable particulate spreader comprising:

a container having a closed end, an open end and a storage chamber for holding particulate matter therein, said container comprising a cylindrical body having a venturi shaped constricted throat;

a first handle attached to a side of said container proximate said closed end;

a second handle attached to said side of said container proximate a mid-point between said closed end and said constricted throat;

an openable diaphragm within said venturi shaped constricted throat, said diaphragm adapted to selectively allow and deny passage of said particulate mater through said venturi shaped constricted throat;

dispersing means for dispersing said particulate matter from said open end of said container, said dispersing means comprising:
   an electric motor operatively attached, proximate said constricted throat and within said container,
   a bracket adapted for mounting said electric motor within said spreader;
   a impeller, said impeller comprising a propeller having radiating blades mounted on a drive shaft of said electric motor, said radiating blades adapted to rotate about said drive shaft and eject said particulate matter out of said open end of said container;

a battery operatively connected to said electric motor; and a switch mounted on said container and operatively connected between said electric motor and said battery.

* * * * *